Figure 1:
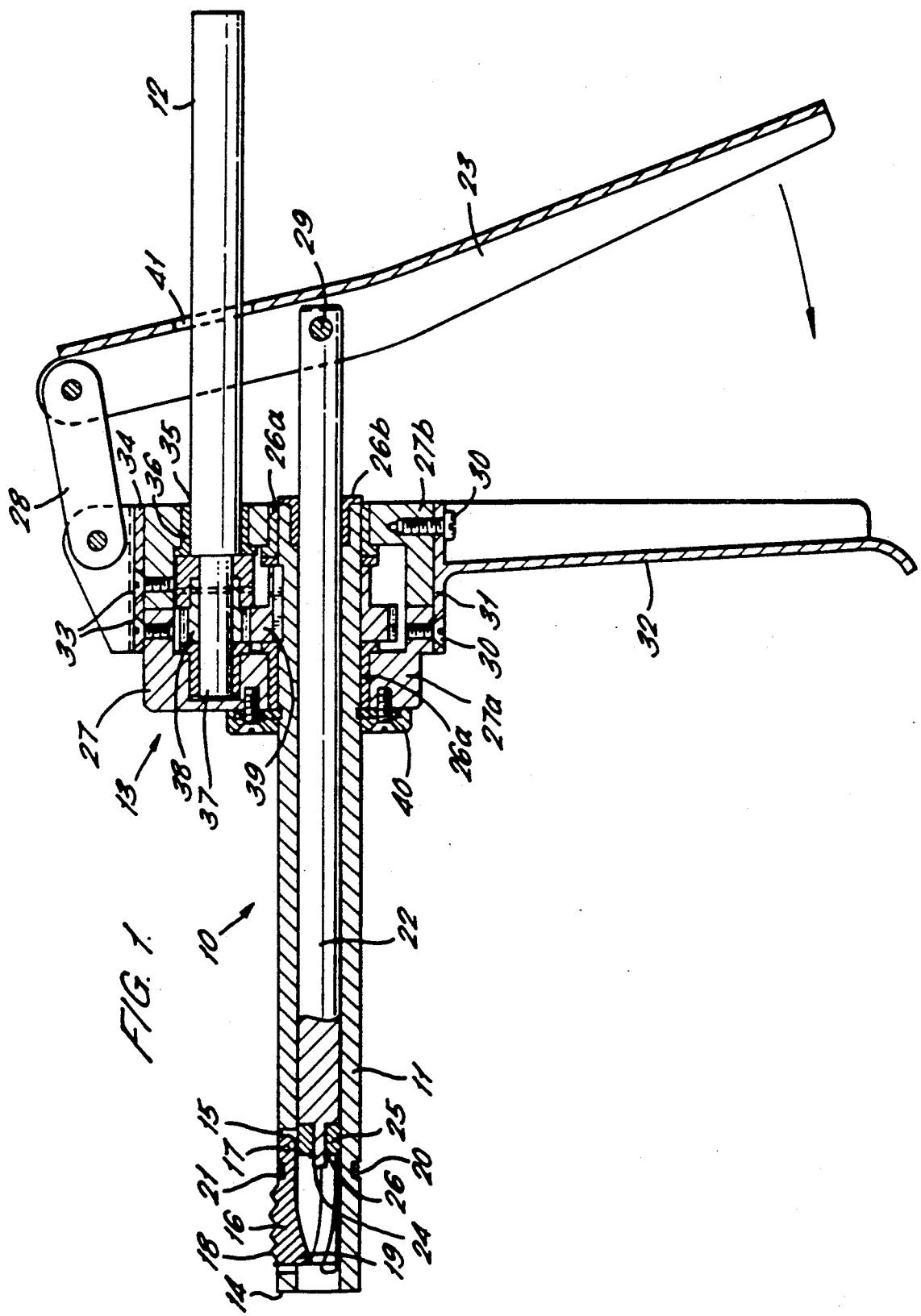

United States Patent [19]

Payne

[11] Patent Number: 5,110,238
[45] Date of Patent: May 5, 1992

[54] DRILLS

[76] Inventor: David P. Payne, 30 Park Road, Berrylands, Surbiton, Surrey KT5 8QD, United Kingdom

[21] Appl. No.: 729,214

[22] Filed: Jul. 12, 1991

[30] Foreign Application Priority Data

Jul. 16, 1990 [GB] United Kingdom ............. 9015577

[51] Int. Cl.⁵ .......................................... B23B 51/00
[52] U.S. Cl. ................................... 408/159; 82/1.2
[58] Field of Search ............. 408/158, 159, 172, 180; 82/1.2

[56] References Cited

U.S. PATENT DOCUMENTS

| 729,647 | 6/1903 | Nutting | 408/159 |
|---|---|---|---|
| 1,511,898 | 10/1924 | Makay | 408/159 |
| 2,236,944 | 4/1941 | Gerardi | 408/159 |
| 2,541,537 | 2/1951 | Newcomb | 408/158 |
| 2,940,367 | 6/1960 | Cogsdill | 408/158 |
| 3,815,694 | 6/1974 | Giustino | 408/159 |
| 4,498,820 | 2/1985 | Brennan | 82/1.2 |
| 4,847,961 | 7/1989 | Donovan et al. | 408/159 |

FOREIGN PATENT DOCUMENTS 2157207 3/1985 United Kingdom .
2184962 1/1986 United Kingdom .

Primary Examiner—Daniel W. Howell
Attorney, Agent, or Firm—Kinney & Lange

[57] ABSTRACT

The invention relates to improvements in drills for undercutting holes and in particular to expansible drills. The drill according to the invention comprises a rotatable tubular drill body having an axial bore, at least one radially extending arm attached by hinge means at one end to the drill body such that the arm is pivotal radially outwards, cutting means formed in the arm, guide means for moving the arm radially outwards, said guide means comprising a non-rotating shaft, and means for moving the shaft axially relative to the drill body towards said one end, so as to cause the arm to pivot radially outwards.

8 Claims, 1 Drawing Sheet

DRILLS

The invention relates to improvements in drills for undercutting holes.

Many building components such as walls, roofs etc. are required to support some form of fixing, such as a bolt or an anchor. Many such fixings are used nowadays which have an expanding sleeve or skirt, which, once the fixing is inserted into a bore in the building component, is then expanded. Expanding fixings are advantageous in that they provide an increase in the bearing strength of the fixing for a smaller contact area. Thus the fixing may be more securely fixed or a shorter fixing and shallower hole may be used.

The main disadvantage of such fixings lies in that there is only a small area of actual contact between the fixing and the walls of the bore in which it is affixed.

Some drills are now available which are capable of forming an undercut or cavity within the bore below the surface of the component. When a fixing is expanded in an undercut bore, there is a far greater area of contact between the fixing and the walls of the bore and it is far more secure.

Applicant's published patent application GB-A-2184962 describes an expansible drill for forming an undercut. The drill disclosed in this document comprises a cylinder having an incorporated cutting edge at one end. The end of the cylinder is slotted and can be expanded by tightening a nut on the end of the central shaft sticking out of the bore. This forces a frusto-conical wedge inside the slotted end of the cylinder causing it to expand radially.

The problem with this drill is that whilst it functions extremely well it is expensive to produce.

GB-B-2157207 also discloses an undercutting drill. Again in this drill the blades carrying the cutting teeth are flexible and are forced to expand radially as the body of the drill is forced over the conical guide. The latter is effected by pushing the drill against the bottom of the bore so that the guide, which is movable axially relative to the drill body, can move no further and the blades thus slide over the guide sides and consequently are expanded. Alternatively, a collar is described which bears on the outer surface of the material having the bore. The collar is fixed to the lower half of the drill body, whilst the upper half is movable relative thereto in a axial direction.

The retraction of this drill relies on the recovery of the blades which have been forced to expand. If this were not to happen, perhaps due to fatigue or excessive friction the drill would be useless. Additionally the bore would probably be wrecked whilst trying to extract the useless drill. It has been found that the drill is also difficult to use because of the force required to expand the blades. The friction caused by the blades moving over the cruciform guide is quite substantial and prevents ease of use. Also the length of the drill required to ensure that the upper and lower parts of the drill body are movable relative to each other made the drill cumbersome and difficult to use.

It is an object of the present invention to provide an improved drill for forming an undercut in the cylindrical bore which substantially overcomes these disadvantages.

According to the present invention there is provided an expansible drill for undercutting holes comprising a rotatable tubular drill body having an axial bore, at least one radially extending arm attached by hinge means at one end to the drill body such that the arm is pivotal radially outwards, cutting means formed in the farm, guide means for moving the arm radially outwards, said guide means comprising a non-rotating shaft, and means for moving the shaft axially relative to the drill body towards said one end, so as to cause the arms to pivot radially outwards.

There is a substantial advantage in using a pushing action to expand the drill as it is a more natural action than a pulling action.

A preferred embodiment of the present invention will now be described, by way of example only, with reference to the accompanying drawing, in which FIG. 1 is a sectional side view of the undercutting drill.

The undercutting drill 10 comprises a rotatable tubular body 11 which is driven by input shaft 12 connected to a drill (not shown) through the gear box 13, described in further detail below.

The tubular body 11 is made from steel or any other suitable material and at the cutting end 14 thereof has one or more axial slots 15 formed therein. Positioned within each slot 15 and hinged to the drill body is a pivotal arm 16. The hinge can be of any suitable form, such as a coaxial hole drilled through the tube 11 and through each arm 16, with a pin 17 pushed through the hole 19. The hinge allows one end of the arm 16 to swing out radially in an arc. In the outer surface of each arm 16 are formed cutting teeth 18 and the arm(s) 16 are substantially the same length as the slot(s) 15. In a preferred embodiment of the invention three arms 16 are used, although the invention is not limited to this number. The inner surface of the arm(s) 16 is curved to form a projection 19 at the end furthest from the hinge.

A circlip 20 or other suitable means is used to prevent the arm(s) 16 from swinging out of the slot(s) 15 of their own accord. The circlip 20 generally restrains the arm(s) 16 so that the projection 19 lies within the bore of the tube 11. The circlip 20 must be of suitable design to allow the arm(s) 16 to be extended when a suitable force is applied, but which easily recovers its original position when the force is removed to cause the arm(s) 16 to retract again as shown in FIG. 1. The circlip 20 lies within a groove 21 in the outer surface of the tube body 11.

Slideably located within the tube body 11 is a non-rotating shaft 22 which is axially slideable relative to the tube body 11. Movement is effected by means of a trigger 23 which is pivotally attached to the non-rotating shaft 22 at pivot point 29 and to the top of the gear box casing 27 via linkage 28. Fastened to the gear box casing 27 on its underside is a fixed handle 32.

Located on a spigot 24 on the end of the non-rotating shaft 22 is a rotatable collar 25 held in position by a circlip 26. When the drill is in use and the tube body 11 is rotating relative to the shaft 22 the collar 25 which is in contact with the inner surface of the arm(s) 16 will also rotate thus avoiding friction between the tube body 11 and shaft 22. The projection 19 on the inner surface of the arm 16 is shaped such that as the collar 25 travels towards the end of the rotating tube 11 it forces the projection 19 outwards such that the arms 16 swing outwards.

The tube body 11 is rotatably mounted at one end in the gear box 13 by means suitable bearings 26a. A further bearing 26b is located between the non-rotating shaft 22 and the rotating tube 11 where non-rotating tube 11 exits the gear box 13 to attach to trigger handle 23 to enable relative movement therebetween.

The gear box casing 27 may be in two parts 27a and 27b for ease of manufacture and assembly. The two parts of the casing 27a, 27b are held together at their undersides by means of a pair of screws 30 placed through a flange 31 in the handle 32 each of which screws into one of the casing parts 27a, 27b. The upper parts of the casings 27a, 27b, are held together by a similar arrangement of a pair of screws 33 and a flange 34 attached to which is the trigger linkage 28.

The input shaft 12 enters the rear half of the gear box casing 27b through an aperture 35 within which is mounted a bearing 36 to allow the shaft 12 to rotate relative to the casing 27. The shaft is stepped to a smaller diameter 37 on which is mounted a secondary gear 39 which is mounted on the rotating tube body 11. A dust and grit cover 40 may be mounted over the front of the gear box casing 27 to prevent drilled-out material from entering the gear box 13.

The trigger 23 has an aperture 41 therein through which the input shaft 12 projects. It is of a size which allows the trigger 23 to be moved without interfering with the input shaft 12.

In use, a cylindrical hole is first drilled in the building component using standard equipment. The drill 10 is then connected to power driving means which firmly clamps the input shaft 12 where it projects past the trigger 23. The tubular body 11 of the drill 10 is then inserted in the hole until the cutting end 14 contacts the blind end of the hole. As the input shaft 12 is driven by the power means this drives the rotating tube 11 through the primary and secondary gears 38, 39. As the trigger 23 is gently squeezed towards the handle 32 the non-rotating shaft 22 is moved axially relative to the rotating tube 11 towards the blind end of the hole. As the collar 25 travels along in contact with the inner surface of the arm(s) 16 it forces the arm(s) outwards thereby expanding the drill (10) to cut a conical shaped undercut.

When the drill 10 is to be withdrawn from the bore, the trigger 23 is pulled away from the handle 32 thus retracting the non-rotating shaft 22. The circlip 20 then is allowed to recover causing the arm(s) 16 to move inwards to their original position. The drill 10 may then be withdrawn.

The trigger 23 provides a far greater degree of control/accuracy in expanding the drill over the known methods of expanding drills, such as winding a frustoconical guide up into the rotating shaft, bearing against the end of a blind bore and so on.

Having an external control would also enable a calibrating device too easily to be attached to the trigger to monitor the degree of expansion of the drill.

I claim:

1. An expansible drill for undercutting holes comprising a rotatably tubular drill body having an axial bore, at least one radially extending arm attached by hinge means at one end to the drill body such that the arm is pivotal radially outwards, cutting means formed in the arm, guide means for moving the arm radially outwards, wherein said guide means comprise a non-rotating shaft, a sleeve rotatably mounted on a first end of the non-rotation shaft, the arms being held in contact with the rotating sleeve, and means for moving the shaft axially relative to the drill body towards said one end, so as to cause the arm to pivot radially outwards.

2. An expansible drill as claimed in claim 1 in which there are three arms disposed within slots cut axially in an end of the drill body.

3. An expansible drill as claimed in claim 1 in which the arm has a protrusion on its inner side which extends within the drill body bore.

4. An expansible drill as claimed in claim 1 in which the non-rotating shaft is attached at a second end thereof to trigger means, the trigger means comprising a handle pivotally attached to the drill and movable relative to the axis of the drill body.

5. An expansible drill as claimed in claim 1 further comprising an input shaft connected to drive said drill body through gear means.

6. An expansible drill as claimed in claim 5 in which the gear means are enclosed within a housing.

7. An expansible drill as claimed in claim 6 in which the housing is sealed to prevent the ingress of dust and the like.

8. An expansible drill as claimed in claim 6 in which the housing is formed in two parts.

* * * * *